United States Patent
Okawa et al.

(10) Patent No.: US 7,125,615 B2
(45) Date of Patent: Oct. 24, 2006

(54) MAGNETIC RECORDING MEDIUM AND MAGNETIC RECORDING DEVICE

(75) Inventors: Shuichi Okawa, Tokyo (JP); Takahiro Suwa, Tokyo (JP)

(73) Assignee: TDK Corporation, Tokyo (JP)

(*) Notice: Subject to any disclaimer, the term of this patent is extended or adjusted under 35 U.S.C. 154(b) by 251 days.

(21) Appl. No.: 10/721,418

(22) Filed: Nov. 26, 2003

(65) Prior Publication Data

US 2004/0157033 A1 Aug. 12, 2004

(30) Foreign Application Priority Data

Nov. 27, 2002 (JP) .......................... P2002-344406

(51) Int. Cl.
*G11B 5/66* (2006.01)
*G11B 5/70* (2006.01)

(52) U.S. Cl. .................................... 428/828

(58) Field of Classification Search ................ 428/828, 428/827, 831, 900
See application file for complete search history.

(56) References Cited

U.S. PATENT DOCUMENTS

| 5,082,749 A | 1/1992 | Carcia |
| 5,563,000 A | 10/1996 | Hatwar et al. |
| 5,660,930 A | 8/1997 | Bertero et al. |
| 6,475,611 B1 | 11/2002 | Chen |
| 2002/0101692 A1 | 8/2002 | Fullerton et al. |

FOREIGN PATENT DOCUMENTS

| JP | A 5-067322 | 3/1993 |
| JP | A 5-151631 | 6/1993 |
| JP | A 5-275235 | 10/1993 |
| JP | A 2002-025032 | 1/2002 |

OTHER PUBLICATIONS

Ohmori H. and Maesaka A. "Magnetic Properties of a Co/Pd Artificial Super-Lattice Deposited on Single-Crystal MgO." *Sony Corporation Core Technology & Network Company Core Technology Development Center*, vol. 26, No. 4, 2002.

Asahi, T. et al. "Preparation of Co/Pd Multilayer Perpendicular Magnetic Recording Media with Carbon Under Layer." *Kagami Memorial Laboratory for Materials Science and Technology*, vol. 25, No. 4-2, 2001 pp. 575-578.

*Primary Examiner*—Holly Rickman
(74) *Attorney, Agent, or Firm*—Oliff & Berridge, PLC

(57) ABSTRACT

The magnetic recording medium includes a seed layer and a magnetic recording layer formed on the seed layer. The magnetic recording layer is provided with a plurality of laminated layers and a noble metal layer. The laminated layer includes a transition metal element layer and a platinum group element layer. The noble metal layer is interposed between the laminated layers. The magnetic recording medium satisfies the relational expression $0<Y/X\leq1.0$, where X is the thickness of the seed layer, and Y is the sum total of the thickness of the noble metal layer in the magnetic recording layer.

16 Claims, 5 Drawing Sheets

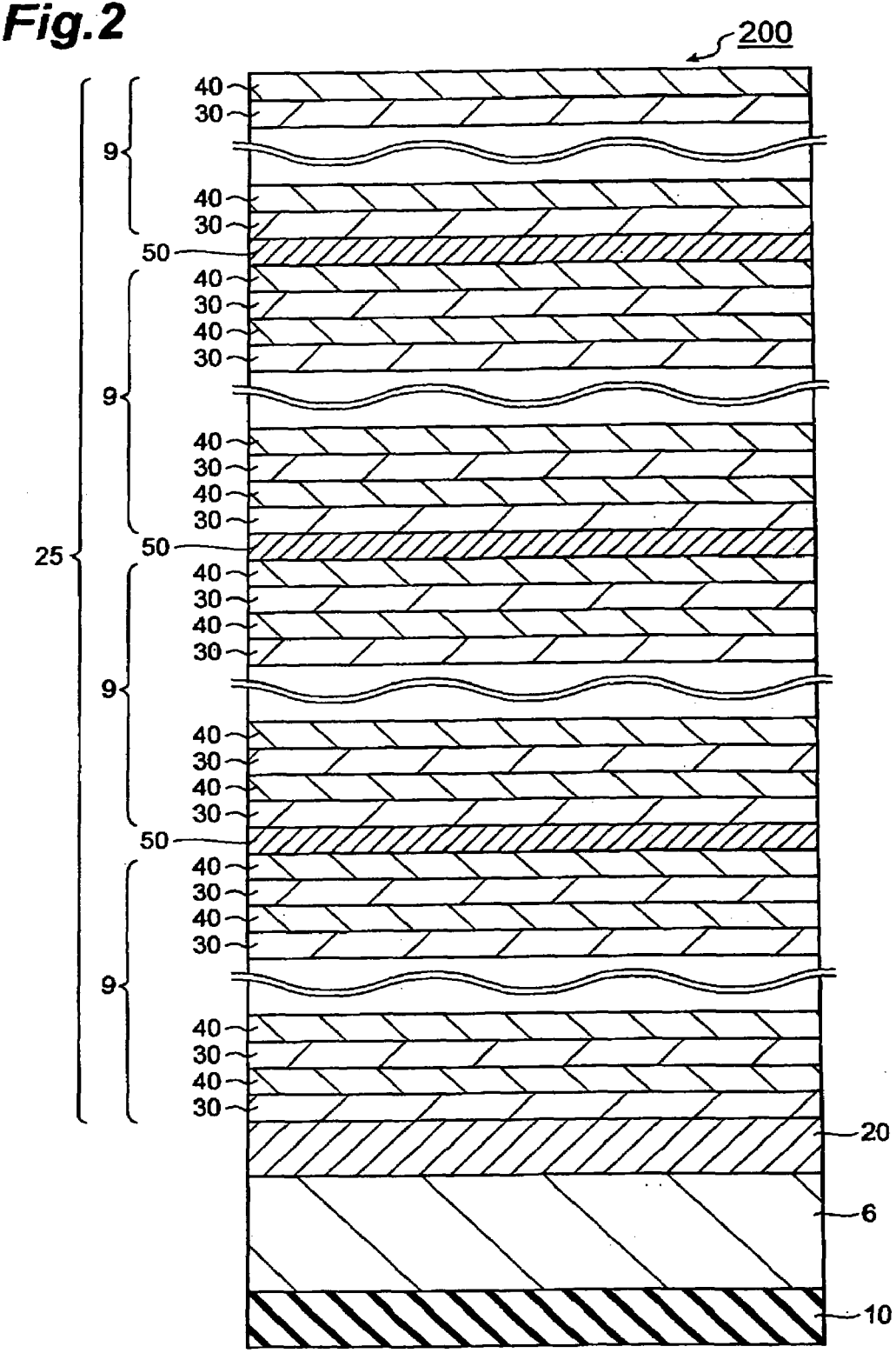

Fig.3

| | THICKNESS OF Ag SEED LAYER X (nm) | THICKNESS OF EACH Ag LAYER IN MAGNETIC RECORDING LAYER (nm) | NUMBER OF Ag LAYERS IN MAGNETIC RECORDING LAYER (-) | SUM TOTAL OF THICKNESS OF Ag LAYERS IN MAGNETIC RECORDING LAYER Y (nm) | ENTIRE THICKNESS OF MAGNETIC RECORDING LAYER (nm) | Y/X [-] | α [-] | COERCIVE FORCE Hc (kA/m) | CRYSTAL GRAIN SIZE (nm) |
|---|---|---|---|---|---|---|---|---|---|
| EXAMPLE 1 | 3.0 | 0.1 | 18 | 1.8 | 26.8 | 0.60 | 1.400 | 402 | 20 |
| EXAMPLE 2 | 4.2 | 0.1 | 18 | 1.8 | 26.8 | 0.43 | 1.246 | 426 | 20 |
| EXAMPLE 3 | 3.0 | 0.5 | 3 | 1.5 | 26.5 | 0.50 | 1.326 | 501 | 20 |
| EXAMPLE 4 | 3.0 | 0.8 | 3 | 2.4 | 27.4 | 0.80 | 1.351 | 480 | 20 |
| EXAMPLE 5 | 3.0 | 1.0 | 3 | 3.0 | 28.0 | 1.00 | 1.398 | 449 | 20 |
| COMPARATIVE EXAMPLE 1 | 3.0 | 0.2 | 18 | 3.6 | 28.6 | 1.20 | 1.547 | 344 | 20 |
| COMPARATIVE EXAMPLE 2 | 3.0 | 1.5 | 3 | 4.5 | 29.5 | 1.50 | 1.913 | 350 | 20 |
| COMPARATIVE EXAMPLE 3 | 2.0 | 1.0 | 3 | 3.0 | 28.0 | 1.50 | 1.575 | 374 | 20 |
| COMPARATIVE EXAMPLE 4 | 3.0 | - | 0 | 0.0 | 25.0 | 0.00 | 1.372 | 601 | 30 |

MAGNETIC RECORDING MEDIUM AND MAGNETIC RECORDING DEVICE

BACKGROUND OF THE INVENTION

1. Field of the Invention

The present invention relates to a magnetic recording medium on which data can be magnetically recorded, and a magnetic recording device employing the same.

2. Related Background Art

Perpendicular magnetic recording system, which is capable of high density recording in comparison with conventional longitudinal magnetic recording system, is known as a recording system of a magnetic recording device such as a hard disk. In a magnetic recording medium compatible with the perpendicular magnetic recording, it has been attempted to employ magnetic recording layers such as Co/Pt and Co/Pd having high coercive force and a high squareness ratio as well as high perpendicular magnetic anisotropy. Use of these materials gives a recording magnetic film perpendicular magnetic anisotropy, which is high enough to overcome an increase in effects of thermal fluctuation. This increase accompanies finer recording bits caused by the shift toward high density.

For example, a magnetic recording medium achieving high coercive force and a high squareness ratio is known. In this magnetic recording medium, thickness and a thickness ratio of each layer are controlled in a multilayer film which is alternately formed by stacking magnetic layers such as Co and noble metal layers such as Pt. Alternatively, this multilayer film is additionally laminated with interposing nonmagnetic layers such as Ag.

Another magnetic recording medium is known, in which transition metal layers such as Co and noble metal layers such as Pt are alternately stacked on a foundation layer such as metal or oxide thin film and are heat-treated on the predetermined condition to achieve high coercive force and a high squareness ratio.

Still another magnetic recording medium having a multilayer is known. This multilayer film is alternately laminated with first layers and second layers. The first layers have platinum group layers such as Pt on either side of a transition metal layer such as Ag. A main ingredient of the second layers is Co.

Other magnetic recording media are also known: a magnetic recording medium in which a magnetic recording layer is formed by stacking a Co/Pd multilayer film on a single crystal MgO substrate; a magnetic recording medium in which a Co/Pd multilayer film is stacked on an approximately 30 nm-thick carbon foundation layer; and a magnetic recording medium in which a CoBO/PdBO multilayer film is stacked on a metal foundation layer having a face-centered cubic structure.

SUMMARY OF THE INVENTION

To achieve a magnetic recording medium compatible with further high density recording in the future, media noise needs to be reduced more than ever. Especially, reducing transition noise between bits is extremely effective for reducing media noise of a perpendicular magnetic recording medium. In order to achieve this, it is mandatory to fine grain sizes of magnetic grains and reduce magnetic interaction between magnetic grains. However, grain sizes are not fined enough in conventional magnetic recording media. In addition, there is a problem that trying to reduce magnetic interaction results in extremely large coercive force. Extremely large coercive force will make a magnetic write head difficult to record data onto a magnetic recording medium.

The present invention has been devised to overcome the foregoing difficulties. An object of the present invention is to provide a magnetic recording medium capable of reducing crystal grain size as well as magnetic interaction between magnetic grains without making coercive force extremely large, and a magnetic recording device employing the same.

The magnetic recording medium according to the present invention includes a seed layer containing at least one metal selected from the group consisting of Ag, Au, Pt, Pd, Ru, and Cu; and a magnetic recording layer formed on the seed layer, the magnetic recording layer having a plurality of laminated layers and a noble metal layer placed between the laminated layers, wherein the laminated layers includes a transition metal element layer containing at least one metal selected from the group consisting of Co, Ni, and Fe and a platinum group element layer containing at least one metal selected from the group consisting of Pt and Pd; wherein the noble metal layer contains at least one metal selected from the group consisting of Ag, Au, Ru, and Cu; and wherein a relational expression $0<Y/X \leq 1.0$ is satisfied, where X is thickness of the seed layer, and Y is a sum total of thickness of the noble metal layer in the magnetic recording layer.

According to the magnetic recording medium of the present invention, it is possible to reduce the crystal grain size as well as maintain coercive force of the magnetic recording layer in a preferred range while magnetic interaction between magnetic grains in the magnetic recording layers is sufficiently reduced.

Herein, it is preferred that the magnetic recording layer has a plurality of the noble metal layers.

According to this, the plurality of noble metal layers are interposed in the magnetic recording layer. Accordingly, each noble metal layer can be thinned in the range satisfying the aforementioned relational expression. Thus, magnetic coupling between the laminated layers, which sandwich the noble metal layer, is hard to be decoupled, and the magnetic recording layer is likely to have a single domain structure in a thickness direction.

An example of a specific structure of the magnetic recording medium is as follows: the laminated layers and the noble metal layers are alternately stacked for a plurality of times.

An example of a specific structure of the laminated layers in the magnetic recording medium is as follows: the transition metal element layers and platinum group element layers are alternately stacked for a plurality of times.

Furthermore, the thickness of each noble metal layer is preferably at most 1 nm.

When the thickness of each noble metal layer is at most 1 nm, magnetic coupling between the laminated layers, which sandwich the noble metal layer, is hard to be decoupled, and the magnetic recording layer is likely to have a single domain structure in the thickness direction.

The thickness X of the seed layer is preferably at least 1 nm.

According to this, the seed layer plays a role as a seed for the crystal grain growth of the magnetic recording layer.

The magnetic recording device according to the present invention consists of any one of the foregoing magnetic recording media and a magnetic head for writing and reading data onto and from the magnetic recording medium.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2 is a sectional view showing a magnetic recording medium according to a second embodiment of the present invention.

FIG. 3 is a table showing the structures and characteristics of magnetic recording media of Examples 1 to 5 and Comparative Examples 1 to 4.

DESCRIPTION OF THE PREFERRED EMBODIMENTS

Figure 1:
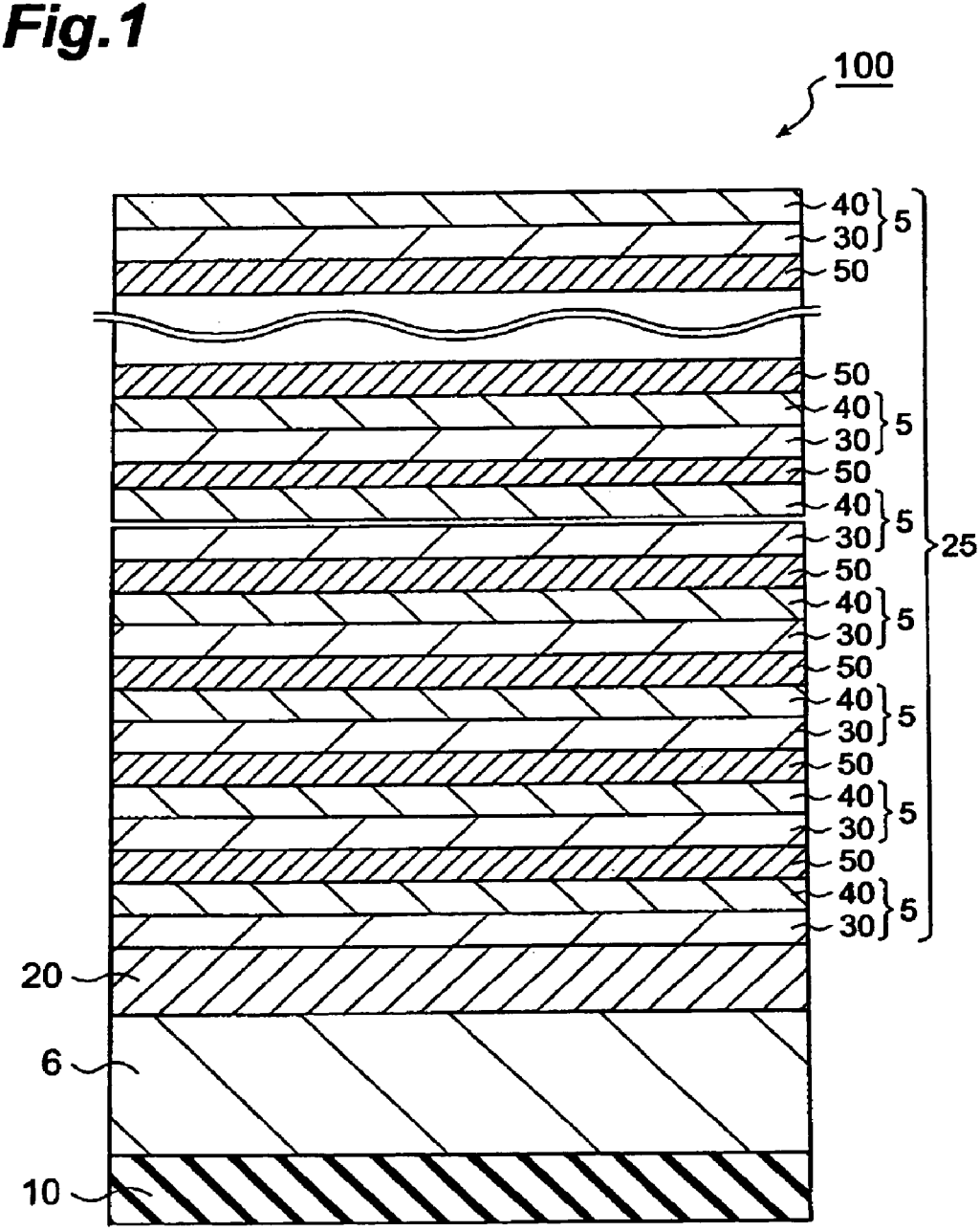
FIG. 1 is a sectional view showing a magnetic recording medium according to a first embodiment of the present invention.

Hereinafter, preferred embodiments of a magnetic recording medium according to the present invention are detailed with reference to the accompanying drawings. Note that the same reference numerals are given to the same or equivalent elements in the descriptions of the drawings, and redundant descriptions are omitted.

First Embodiment

FIG. 1 is a sectional view of a magnetic recording medium 100 of a first embodiment. The magnetic recording medium 100 comprises a substrate 10, an under layer 6, a seed layer 20, and a magnetic recording layer 25. The substrate 10 is formed of glass or the like. The under layer 6 is formed on the substrate 10 and contains a soft magnetic material. The seed layer 20 is formed on the under layer 6. The magnetic recording layer 25 is formed on the seed layer 20 and serves as a perpendicular magnetic recording material.

The under layer 6 forms a magnetic circuit together with a recording head when data is written onto the magnetic recording layer 25 (details will be described later).

The magnetic recording layer 25 is formed by stacking laminated layers 5 and noble metal layers 50 alternately for a plurality of times. Herein, either the noble metal layer 50 or the laminated layer 5 may be in contact with the seed layer 20. Alternatively, the noble metal layer 50 or the laminated layer 5 may be in contact with the seed layer 20 through other layer.

The laminated layer 5 consists of a transition metal element layer 30 and a platinum group element layer 40 stacked on the transition metal element layer 30. Herein, the order of stacking the laminated layer 5 is not limited to this.

The transition metal element layer 30 may be stacked on the platinum group element layer 40.

The platinum group element layer 40 contains at least one metal selected from the group consisting of Pt and Pd. The transition metal element layer 30 contains at least one metal selected from the group consisting of Co, Ni, and Fe.

Herein, it is particularly preferred that Pd be used for the platinum group element layer 40 and Co be used for the transition metal element layer 30. Accordingly, magnetic anisotropy is increased.

Moreover, the noble metal layer 50 contains at least one metal selected from the group consisting of Ag, Au, Ru, and Cu.

The thicknesses of the platinum group element layer 40 and the transition metal element layer 30 are set so that the magnetic recording layer 25 to be formed may exhibit perpendicular magnetic anisotropy. For example, when Pd is used for the platinum group element layer 40 and Co is used for the transition metal element layer 30, the thickness of the Pd layer can be set to 0.8 nm. The thickness of the Co layer can be set to 0.1 nm.

The seed layer 20 contains at least one metal selected from the group consisting of Ag, Au, Pt, Pd, Ru, and Cu. The seed layer 20 functions as a seed for crystal grain growth of the magnetic recording layer 25 and reduces the grain size. Reducing the grain size can reduce the media noise.

This magnetic recording layer 25 can be formed by stacking the transition metal layer 30, the platinum group element layer 40, and the noble metal layer 50 in order on the seed layer 20 for a plurality of times.

Herein, the platinum group element layer 40, the transition metal element layer 30, the noble metal layer 50 and the seed layer 20 can be formed by thin film formation process such as sputtering.

In the magnetic recording medium 100 of the present embodiment, the thickness of the seed layer 20, the thickness of each noble metal layer 50, and the number of times that the noble metal layer is stacked are set to satisfy the relational expression $$0 < Y/X \leq 1.0 \tag{1}$$

where X is the thickness of the seed layer 20, and Y is the sum total of the thickness of each noble metal layer 50 in the magnetic recording layer 25.

Herein, the number of times that the laminated layer 5 and the noble metal layer 50 are stacked in the magnetic recording layer 25 is not particularly limited as long as the above relational expression is satisfied. However, it is preferred that the magnetic recording layer 25 have a plurality of noble metal layers 50 in the range satisfying the relational expression. According to this, since the plurality of noble metal layers 50 are interposed in the magnetic recording layer 25, each noble metal layer 50 can be thinned in the range satisfying the relational expression (1). Thus, magnetic coupling between the laminated layers 5, which sandwich the noble metal layer 50, becomes hard to be decoupled, and the magnetic recording layer is likely to have a single domain structure in a thickness direction.

According to this magnetic recording medium, the thickness of the seed layer 20, the thickness of each noble metal layer 50, and the number of times that the noble metal layer 50 is stacked is set to satisfy the relational expression (1). Accordingly, it is possible to reduce the magnetic interaction between the magnetic grains in the magnetic recording layer 25 sufficiently. Moreover, coercive force of the magnetic recording layer 25 will not be extremely large. Herein, the magnetic interaction includes interaction by exchange coupling.

Therefore, transition noise between bits during writing and reading can be reduced to improve recording density. Simultaneously, it is possible to record data suitably with a magnetic write head.

In a range satisfying the relational expression (1), when Y/X is small, the magnetic interaction between the magnetic grains becomes small. Meanwhile, the coercive force tends to increase. In the same range, when Y/X is large, the magnetic interaction between the magnetic grains becomes large. Meanwhile, the coercive force tends to decrease. Thus, by adjusting Y/X in a range of the relational expression (1), it is possible to set the magnetic interaction between the magnetic grains and the coercive force to preferred values. For example, a magnetic recording medium can be obtained, having coercive force suitable for the capability of the employing recording head and sufficiently reducing the magnetic interaction.

Moreover, since the magnetic recording layer 25 has the noble metal layer 50 inside, the crystal grain size of the laminated layer 5 in the magnetic recording layer 25 is reduced. Accordingly, it is possible to reduce transition noise between bits during writing and reading and increase the recording density further.

Herein, the thickness of the seed layer 20 is preferably at least 1 nm, in addition to satisfying the relational expression (1). When the seed layer 20 is extremely thin, the seed layer 20 has a tendency to play a role as a seed for the crystal grain growth of the magnetic recording layer 25 insufficiently. On the other hand, when the seed layer 20 is extremely thick, an effective recording magnetic field is reduced between the under layer 6 and the recording head disposed on the other side of the under layer 6 through magnetic recording layer 25 during writing. Hence, an S/N ratio tends to be degraded.

The thickness of the noble metal layer 50 is preferably at most 1 nm, in addition to satisfying the relational expression (1). When the noble metal layer 50 is extremely thick, especially, magnetic coupling between the laminated layers 5, which are in contact with either side of the noble metal layer 50, is easily decoupled. Therefore, the magnetic recording layer 25 tends to have a multidomain structure in the thickness direction.

The entire thickness of the magnetic recording layer 25 is preferably at most 40 nm, and more preferably at most 30 nm, in addition to satisfying the relational expression (1). When the magnetic recording layer 25 is extremely thick, the effective recording field is reduced between the magnetic recording head and the under layer 6, and thereby there is a tendency that stable recording magnetization is hard to be obtained.

Second Embodiment

Next, a magnetic recording medium 200 according to a second embodiment will be described with reference to FIG. 2.

Unlike the magnetic recording medium 100 in the first embodiment, the magnetic recording medium 200 according to the present embodiment has laminated layers 9 and noble metal layers 50 alternately stacked on a seed layer 20 for a plurality of times. Herein, either the noble metal layer 50 or the laminated layer 9 may be in contact with the seed layer 20. In addition, the noble metal layer 50 or the laminated layer 9 may be in contact with the seed layer 20 through other layer.

The laminated layer 9 is formed by stacking a platinum group element layer 40 and a transition metal element layer 30 alternately for a plurality of times. The number of times that the platinum group element layer 40 and the transition metal element layer 30 are stacked is not particularly limited as long as the number is plural.

The platinum group element layer 40, the transition metal element layer 30, the noble metal layer 50, the seed layer 20, the under layer 6, and the substrate 10 are the same as those in the first embodiment. The order of stacking the platinum group element layer 40 and the transition metal element layer 30 of the laminated layer 9 is not limited.

Also in the present embodiment, the thickness of the seed layer 20, the number of times that the noble metal layers 50 are stacked, and the thickness of each noble metal layer 50 are set to satisfy the relational expression (1), where X is the thickness of the seed layer 20, and Y is the sum total of the thickness of the noble metal layers 50 in the magnetic recording layer 25.

Also in this magnetic recording medium 200, by setting the thickness X of the seed layer 20 and the sum total Y of the thickness of the noble metal layers 50 to satisfy the relational expression (1) similar to the first embodiment, the magnetic recording medium 200 exhibits the same operation and effects as that in the first embodiment.

Moreover, preferred conditions for the thickness of the seed layer 20, the thickness of the noble metal layer 50, and the entire thickness of the magnetic recording layer 25 are the same as those in the first embodiment.

Next, the magnetic recording media according to the foregoing embodiments were prepared, and various characteristics thereof were examined.

First, the magnetic recording media, which are the same as those in the first embodiment, were prepared in Examples 1 and 2.

EXAMPLE 1

Under the reduced pressure atmosphere, firstly, a 3.0 nm-thick Ag seed layer was formed on a glass substrate. Secondly, 0.1 nm-thick Co, 0.8 nm-thick Pd, 0.1 nm-thick Co, 0.1 nm-thick Ag, 0.8 nm-thick Pd, 0.1 nm-thick Co, 0.1 nm-thick Ag, and 0.8 nm-thick Pd were stacked. Thirdly, the stacking was repeated for eight times with this order (Co/Pd/Co/Ag/Pd/Co/Ag/Pd) and the same thickness of each layer. Finally, 0.1 nm-thick Co and 0.6 nm-thick Pd were stacked. The entire thickness of the magnetic recording layer stacked on the Ag seed layer was approximately 26.8 nm. The sum total of the thickness of the Ag layers in the magnetic recording layer was 1.8 nm. At this time, the result of (Y/X) obtained by (sum total of the thickness of the Ag layers in the magnetic recording layer/the thickness of Ag seed layer) was 0.60.

Herein, the Ag seed layer and the Co, Pd, and Ag layer were formed by employing DC sputtering and setting a vacuum reaching degree to $9 \times 10^{-6}$ Pa before sputtering. When the Ag seed layer was formed, power was set to 150 W, and the atmosphere was set to Ar gas of 2 Pa. When the Co layer was formed, power was set to 140 W, and the atmosphere was set to Ar gas of 0.3 Pa. When the Pd layer was formed, power was set to 36 W, and the atmosphere was set to Ar gas of 2 Pa. When the Ag layer was formed, power was set to 150 W, and the atmosphere was set to Ar gas of 2 Pa.

EXAMPLE 2 AND COMPARATIVE EXAMPLE 1

A magnetic recording medium of Example 2 was prepared. The magnetic recording medium of Example 2 was the same as that of Example 1, except that the thickness of the Ag seed layer was set to 4.2 nm. In this case, Y/X was 0.43. Additionally, a magnetic recording medium of Comparative Example 1 was prepared. The magnetic recording medium of Comparative Example 1 was the same as that of Example 1, except that the thickness of the Ag layer in the magnetic recording layer was set to 0.2 nm. The entire thickness of the magnetic recording layer was 28.6 nm, and the sum total of the thickness of the Ag layers in the magnetic recording layer was 3.6 nm so that Y/X was 1.2.

Moreover, a magnetic recording medium was prepared in each of Examples 3 to 5, which was the same as that of the second embodiment.

EXAMPLE 3

Under the reduced pressure atmosphere, a 3 nm-thick Ag seed layer was formed on the glass substrate. A magnetic recording layer was formed on the Ag seed layer with the following steps. Firstly, seven laminated layers, in which Co (0.1 nm)/Pd(0.8 nm) were stacked in order from the Ag seed layer side, were stacked to form a laminated structure. Secondly, a 0.5 nm-thick Ag noble metal layer was formed on the laminated structure. Moreover, the same laminated structure and the same noble metal layer were stacked twice alternately. Furthermore, on the top, six laminated layers, in which Co (0.1 nm)/Pd(0.8 nm) were stacked in order from the Ag seed layer side, were stacked. On the top, one laminated layer, in which Co (0.1 nm)/Pd (0.6 nm) were stacked in order from the Ag seed layer side, was stacked. The entire thickness of the magnetic recording layer stacked on the Ag seed layer was approximately 26.5 nm. In addition, the sum total of the thickness of the Ag layer in the magnetic recording layer was 1.5 nm. Y/X was 0.5. The sputtering conditions and the like were the same as those in Example 1.

EXAMPLES 4 AND 5

A magnetic recording medium of Example 4 was prepared. The magnetic recording medium of Example 4 was the same as that of Example 3, except that the thickness of the noble metal layer was set to 0.8 nm. A magnetic recording medium of Example 5 was prepared. The magnetic recording medium of Example 5 was the same as that of Example 3, except that the thickness of the noble metal layer was set to 1.0 nm. The entire thickness of the magnetic recording layer was approximately 27.4 nm in the magnetic recording medium of Example 4. The sum total of the thickness of the Ag layers in the magnetic recording layer of Example 4 was 2.4 nm, and Y/X was 0.8. The entire thickness of the magnetic recording layer was approximately 28.0 nm in the magnetic recording medium of Example 5. The sum total of the thickness of the Ag layers in the magnetic recording layer of Example 5 was 3.0 nm. Thus, Y/X became 1.0.

COMPARATIVE EXAMPLES 2 AND 3

A magnetic recording medium of Comparative Example 2 was prepared. The magnetic recording medium of Comparative Example 2 was the same as that of Example 3, except that the thickness of the noble metal layer was set to 1.5 nm. A magnetic recording medium of Comparative Example 3 was prepared. The magnetic recording medium of Comparative Example 3 was the same as that of Example 5, except that the thickness of the Ag seed layer was set to 2.0 nm. The entire thickness of the magnetic recording layer was approximately 29.5 nm in the magnetic recording medium of Comparative Example 2. The sum total of the thickness of the Ag layer was 4.5 nm in the magnetic recording layer of Comparative Example 2, and Y/X was 1.5. The entire thickness of the magnetic recording layer was approximately 28.0 nm in the magnetic recording medium of Comparative Example 3. The sum total of the thicknesses of the Ag layers was 3.0 nm in the magnetic recording layer of Comparative Example 3, and Y/X was 1.5.

COMPARATIVE EXAMPLE 4

On a 3 nm-thick Ag seed layer, 0.1 nm-thick Co and 0.8 nm-thick Pd were stacked for 27 times as a total. Moreover, on the top, 0.1 nm-thick Co and 0.6 nm-thick Pd were stacked to create a magnetic recording medium of Comparative Example 4. The sputtering conditions for the stacking were the same as those in the aforementioned Example 1. The sum total of the thickness of the Ag layer in the magnetic recording layers was 0.0 nm in the magnetic recording medium of Comparative Example 4, and Y/X was 0.0.

The total thickness of the Co layers and the Pd layers in Examples 1 to 5 and Comparative Example 1 to 4 were all 25 nm. Conditions and the like for each magnetic recording medium are listed in table in FIG. 3.

Figure 4:
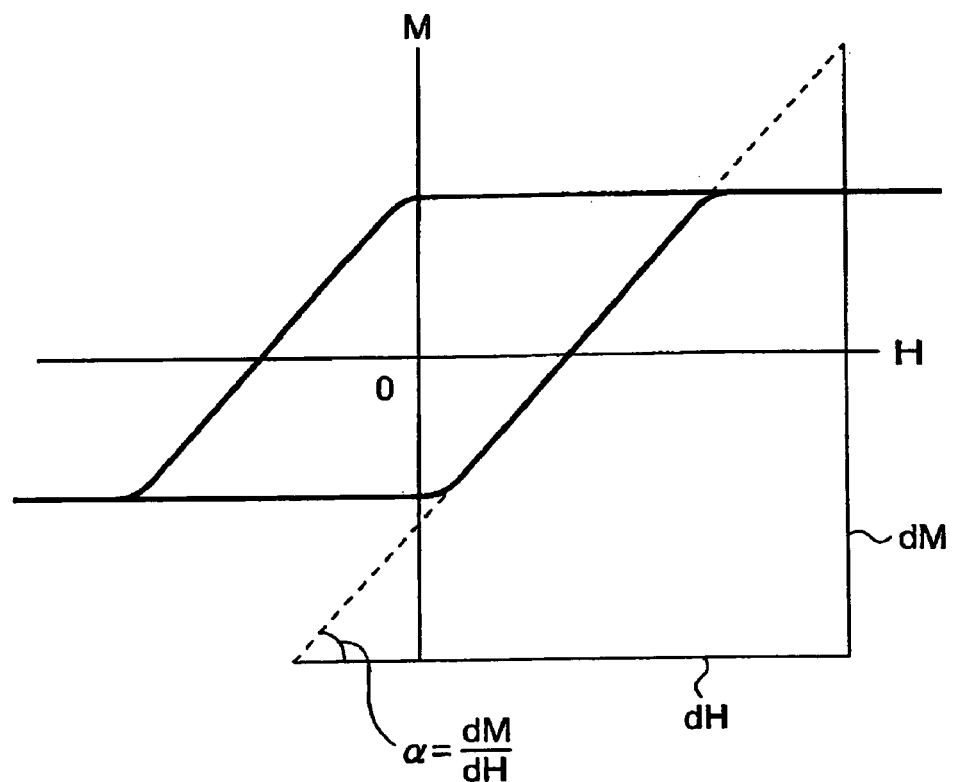
FIG. 4 is a view for explaining a method of deriving α from a magnetization curve.

A magnetization curve of each magnetic recording medium thus obtained was measured by VSM (Vibrating Sample Magnetometer), and coercive force Hc was derived. At the same time, the crystal grain size was measured by AFM, and the each average crystal grain size was obtained. In addition, interaction parameter α was derived based on the magnetization curve in a direction perpendicular to the magnetic recording layer of the magnetic recording medium. The interaction parameter indicates the degree of intensity of magnetic interaction between the magnetic grains in the magnetic recording layer. Specifically, as shown in FIG. 4, inclination of the magnetization curve in the perpendicular direction, in other words, dM/dH was derived and set as the interaction parameter α. Herein, "α=1" indicates that there is no magnetic interaction between the magnetic grains. In the case where α is larger than 1, the larger α is, the stronger the magnetic interaction between the magnetic grains is. These results are listed in FIG. 3.

In Comparative Example 4 without Ag layers in the magnetic recording layer, coercive force Hc became 601 kA/m, which was extremely large, although α was sufficiently low. In addition, the crystal grain size was 30 nm, thus grains were not sufficiently fined.

In Comparative Examples 1 to 3 incorporating Ag layers in the magnetic recording layer under the condition of Y/X>1, the coercive force Hc was reduced by incorporating the Ag layers. However, α exceeds 1.5. Thus, it is not preferred.

By contrast, in Examples 1 to 5 incorporating Ag layers in the magnetic recording layers under the condition of 0<Y/X≦1, α was maintained at most 1.5 while the coercive force Hc was suppressed to at most 520 kA/m. Thus, it was confirmed that the magnetic recording media in Examples 1 to 5 were preferred as perpendicular magnetic recording media. Note that α is preferably set to at most 1.5 to perform high density perpendicular recording of 200 Gbpsi.

As apparent from the tendencies of Examples 1 and 2, or 3 to 5, there are following tendencies. That is, the smaller Y/X is, the smaller α is and the larger the coercive force Hc is. In addition, the larger Y/X is, the larger α is and the smaller the coercive force Hc is. Accordingly, by adjusting Y/X, α and Hc can be set in a preferred ratio.

As shown in Examples 1 to 5 and Comparative Examples 1 to 3, the crystal grain size became 20 nm in the structure having an Ag layer interposed between a pair of laminated layers in the magnetic recording layers. The structure has effects on reducing the crystal grain size compared with the case where the Ag layer interposed between a pair of laminated layers is not included in the magnetic recording layer as in Comparative Example 4.

Note that, in Examples 1 to 5, the coercive force Hc is sufficient since the coercive force exceeds 280 kA/m (3.5 kOe), which is required for a magnetic recording medium.

Note that, the magnetic recording medium according to the present invention is not limited to the foregoing embodiments and can take various modification forms.

For example, although the magnetic recording medium has the plurality of noble metal layers 50 in the aforementioned embodiments, the magnetic recording medium is not limited to this. That is, it is necessary for the magnetic recording medium only to have the plurality of laminated layers 5 and a noble metal layer 50 between at least a pair of laminated layers 5 and 5.

Third Embodiment

Figure 5:
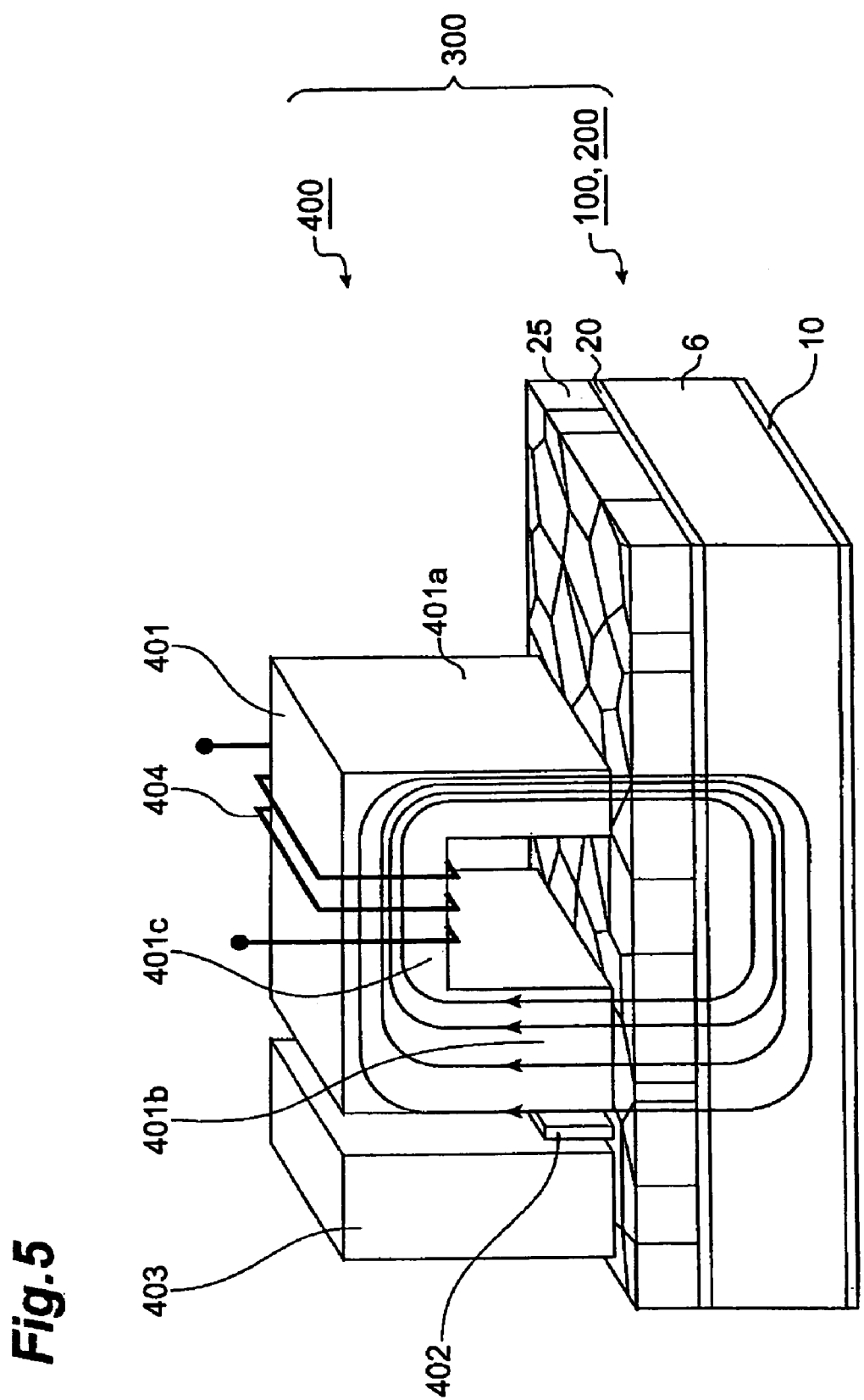
FIG. 5 is a perspective view showing a magnetic recording device according to an embodiment of the present invention.

Next, a magnetic recording device 300 according to the present invention will be described with reference to FIG. 5. The magnetic recording device 300 according to the present invention comprises the aforementioned magnetic recording medium 100 and a magnetic head 400 for writing and reading data onto and from the magnetic recording medium 100. Herein, the magnetic recording medium 200 of the second embodiment may be employed as the magnetic recording medium, instead of the magnetic recording medium 100 of the first embodiment.

The magnetic head 400 comprises a recording head 401 which is a single-pole type, a reading element 402, and a shield 403. The magnetic head 400 is disposed to face the magnetic recording layer 25 of the magnetic recording medium 100.

The recording head 401 is constituted by a first magnetic pole 401a, a second magnetic pole 401b, a connecting part 401c, and an exciting coil 404. The second magnetic pole 401b is separated from the first magnetic pole 401a with a predetermined space along the surface of the magnetic recording medium 100. The connecting part 401c connects the first and second magnetic poles 401a and 401b at a position separated from the magnetic recoding medium 100 in a predetermined space. The exciting coil 404 is wound around the connecting part 401c.

A sectional area of a portion facing the magnetic recording medium 100 in the first magnetic pole 401a, which is taken along the magnetic recording medium 100, is smaller than a sectional area of a portion of the second magnetic pole 401b facing the magnetic recording medium 100. Magnetic flux generated by the exciting coil 404 passes through the connecting part 401c and is converged at the first magnetic pole 401a. The magnetic flux further passes through the magnetic recording layer 25 and goes back in a direction toward the second magnetic pole 401b (left direction in the drawing) along the under layer 6. While the magnetic flux is spread, the magnetic flux passes through the magnetic recording layer 25 again and goes back to the second magnetic pole 401b. In other words, the under layer 6 forms a magnetic circuit together with the recording head 401 and has an effect to draw the magnetic flux.

The reading element 402 is disposed between the shield 403 and the second magnetic pole 401b of the recording head 401. The second magnetic pole 401b also functions as the other shield of the reading element 402. The reading element 402 is, for example, an magnetoresistive element such as GMR.

In the magnetic recording device 300, the magnetic head 400 and the magnetic recording medium 100 are in relative motion at a predetermined speed. The reading element 402 reads out data by reading a magnetic leakage field from the magnetic recording layer 25 of the magnetic recording medium 100. In addition, the recording head 401 records data on the magnetic recording layer 25 of the magnetic recording medium 100 by the magnetic flux from the first magnetic pole 401a.

According to this magnetic recording device 300, the aforementioned magnetic recording medium is employed. Thus, the magnetic head 400 can suitably perform the recording, and the transition noise between bits is reduced. Therefore, the preferable data can be read out and written suitably.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A magnetic recording medium, comprising:
   a seed layer containing at least one metal selected from the group consisting of Ag, Au, Pt, Pd, Ru, and Cu; and
   a magnetic recording layer formed on said seed layer, said magnetic recording layer having a plurality of laminated layers and a noble metal layer placed between said laminated layers,
   wherein said laminated layers each include a transition metal element layer containing at least one metal selected from the group consisting of Co, Ni, and Fe and a platinum group element layer containing at least one metal selected from the group consisting of Pt and Pd, said transition metal element layer and said platinum group element layer being in direct contact with one another;
   wherein said noble metal layer contains at least one metal selected from the group consisting of Ag, Au, Ru, and Cu; and
   wherein a relational expression $0<Y/X \leq 1.0$ is satisfied, where X is thickness of said seed layer, and Y is a sum total of thickness of said noble metal layer in said magnetic recording layer.

2. The magnetic recording medium according to claim 1, wherein said magnetic recording layer has a plurality of said noble metal layers.

3. The magnetic recording medium according to claim 2, wherein said laminated layers and said noble metal layers are stacked alternately for a plurality of times.

4. The magnetic recording medium according to claim 1, wherein said laminated layers are formed by stacking said transition metal element layer and said platinum group element layer alternately for a plurality of times.

5. The magnetic recording medium according to claim 1, wherein the thickness of each of said noble metal layer is at most 1 nm.

6. The magnetic recording medium according to claim 1, wherein the thickness X of said seed layer is at least 1 nm.

7. A magnetic recording device, comprising:
a magnetic recording medium, comprising:
a seed layer containing at least one metal selected from the group consisting of Ag, Au, Pt, Pd, Ru, and Cu; and
a magnetic recording layer formed on said seed layer, said magnetic recording layer having a plurality of laminated layers and a noble metal layer placed between said laminated layers,
wherein said laminated layers each include a transition metal element layer containing at least one metal selected from the group consisting of Co, Ni, and Fe and a platinum group element layer containing at least one metal selected from the group consisting of Pt and Pd, said transition metal element layer and said platinum group element layer being in direct contact with one another;
wherein said noble metal layer contains at least one metal selected from the group consisting of Ag, Au, Ru, and Cu; and
wherein a relational expression $0<Y/X \leq 1.0$ is satisfied, where X is thickness of said seed layer, and Y is a sum total of thickness of said noble metal layer in said magnetic recording layer; and
a magnetic head for writing and reading data onto and from said magnetic recording medium.

8. The magnetic recording device according to claim 7, wherein said magnetic recording layer has a plurality of said noble metal layers.

9. The magnetic recording device according to claim 8, wherein said laminated layers and said noble metal layers are stacked alternately for a plurality of times.

10. The magnetic recording device according to claim 7, wherein said laminated layers are formed by stacking said transition metal element layer and said platinum group element layer alternately for a plurality of times.

11. The magnetic recording device according to claim 7, wherein the thickness of each of said noble metal layer is at most 1 nm.

12. The magnetic recording device according to claim 7, wherein the thickness X of said seed layer is at least 1 nm.

13. The magnetic recording medium according to claim 1, wherein said noble metal layer is in direct contact with the transition metal element layer.

14. The magnetic recording device according to claim 7, wherein said noble metal layer is in direct contact with the transition metal element layer.

15. The magnetic recording medium according to claim 1, wherein said noble metal layer placed between said laminated layers is in direct contact with the transition metal element layer on one side and with the platinum group element layer on an other side.

16. The magnetic recording device according to claim 7, wherein said noble metal layer placed between said laminated layers is in direct contact with the transition metal element layer on one side and with the platinum group element layer on an other side.

* * * * *